(12) United States Patent
Bratty et al.

(10) Patent No.: US 11,207,850 B2
(45) Date of Patent: Dec. 28, 2021

(54) METHOD FOR CONDITIONING A LOAD BEARING SURFACE AND A SURFACE FORMED THEREBY

(71) Applicant: Illinois Tool Works Inc., Glenview, IL (US)

(72) Inventors: Robert Bratty, Rockford, MI (US); Craig M. Oomen, Lowell, MI (US)

(73) Assignee: Illinois Tool Works Inc., Glenview, IL (US)

(*) Notice: Subject to any disclaimer, the term of this patent is extended or adjusted under 35 U.S.C. 154(b) by 356 days.

(21) Appl. No.: 16/173,745

(22) Filed: Oct. 29, 2018

(65) Prior Publication Data

US 2019/0126574 A1  May 2, 2019

Related U.S. Application Data

(60) Provisional application No. 62/579,401, filed on Oct. 31, 2017.

(51) Int. Cl.
| | |
|---|---|
| *B29C 71/02* | (2006.01) |
| *B60N 2/64* | (2006.01) |
| *A47C 7/14* | (2006.01) |
| *A47C 5/12* | (2006.01) |
| *B60N 2/68* | (2006.01) |
| *A47C 7/28* | (2006.01) |

(Continued)

(52) U.S. Cl.
CPC ............ *B29C 71/02* (2013.01); *A47C 5/12* (2013.01); *A47C 7/14* (2013.01); *A47C 7/282* (2013.01); *B29C 55/04* (2013.01); *B60N 2/646* (2013.01); *B60N 2/686* (2013.01); *B29C 2071/022* (2013.01); *B29L 2031/771* (2013.01)

(58) Field of Classification Search
CPC ...................................................... B29C 71/02
See application file for complete search history.

(56) References Cited

U.S. PATENT DOCUMENTS

| | | |
|---|---|---|
| 7,441,758 B2 | 10/2008 | Coffield et al. |
| 9,173,496 B2 | 11/2015 | Coffieid et al. |
| 9,215,933 B2 | 12/2015 | Coffield et al. |

(Continued)

FOREIGN PATENT DOCUMENTS

JP   H0880388 A   3/1996

OTHER PUBLICATIONS

International Search Report and Written Opinion issued by ISA/EPO in connection with PCT/US2018/058148 dated Jan. 31, 2019.

*Primary Examiner* — Larry W Thrower
(74) *Attorney, Agent, or Firm* — Quarles & Brady LLP

(57) ABSTRACT

A method for conditioning a load bearing surface includes positioning an oriented polymeric membrane in a mount and applying a force to the polymeric membrane so as to create a stress in the membrane. The stressed membrane is heated to a temperature no less than about a temperature that the load bearing surface is expected endure in use. The membrane is maintained at the temperature for a first period of time sufficient to heat the entirety of the membrane and the it is cooled while maintaining the stress on the membrane. Following a predetermined cool down period, the applied stress is removed for availability of the end use product. A seating surface for use in a vehicle that is subjected to an elevated temperature is also disclosed.

14 Claims, 6 Drawing Sheets

(51) Int. Cl.
  *B29C 55/04*   (2006.01)
  *B29L 31/00*   (2006.01)

(56) References Cited

U.S. PATENT DOCUMENTS

| | | | |
|---|---|---|---|
| 2010/0086738 A1* | 4/2010 | Tanaka | D06N 3/14 428/151 |
| 2015/0272332 A1* | 10/2015 | Noguchi | B29C 51/082 297/452.58 |

* cited by examiner

METHOD FOR CONDITIONING A LOAD BEARING SURFACE AND A SURFACE FORMED THEREBY

CROSS-REFERENCE TO RELATED APPLICATION DATA

This application claims the benefit of and priority to Provisional U.S. Patent Application Ser. No. 62/579,401, filed Oct. 31, 2017, titled "Method for Conditioning a Load Bearing Surface and a Surface Formed Thereby", the disclosure of which is incorporated herein in its entirety.

BACKGROUND

The present invention relates to a method of conditioning load bearing surfaces, and more particularly to a method for conditioning molded load bearing surfaces, such as the bottom surface, e.g., the seating surface, or the back of a chair or seat.

There are continuing efforts to develop new and improved load bearing surfaces. In the context of general load bearing surfaces, the primary objectives of these efforts are to obtain a durable, low mass and inexpensive load bearing surface. In the context of seating and other body-support applications, it is also important to address comfort issues. For example, with seating, it can be important to provide a surface that is comfortable and does not create body fatigue over periods of extended use. Given that the load characteristics (e.g. stiffness, resiliency, force/deflection profile) desired in a particular surface will vary from application to application, it is also desirable to have a load bearing surface that is easily tunable for different applications during design and manufacture.

It is known to provide molded load bearing surfaces that are oriented after molding to provide desired load bearing surface characteristics. For example, Coffield, et al., U.S. Pat. Nos. 9,215,933, 9,173,496, and 7,441,758, all entitled "Load Bearing Surface", commonly assigned with the present application and incorporated herein by reference in their entireties, disclose oriented load bearing surfaces that have proven to be a marked improvement over prior known surface in many ways. These surfaces include an elastomeric membrane that is oriented in only a single direction, for example, by compression or stretching to achieve the desired load support characteristics.

While the surfaces disclosed in the aforementioned patents to Coffield function well in controlled environments, such as a typical home or office environment, the characteristics of the molded surfaces will change when subjected to elevated temperatures. These changes in characteristics can impact the useful product service temperatures and limit potential applications. That is, due to the changing material characteristics, the temperatures at which products that use these surfaces are limited. It has also been found that these oriented surfaces tend to creep at elevated temperatures and at elevated temperatures under stress, and that the surfaces may shrink after molding.

Accordingly, there is a need for increasing the useful product service temperatures for products that use molded elastomeric surfaces. Desirably, such an increase in the useful product service temperatures includes increasing the applications for which such surfaces are used.

SUMMARY

A method for conditioning a load bearing surface includes positioning an oriented polymeric membrane in a mount and applying a force to the polymeric membrane so as to create a stress in the membrane. The stressed membrane is heated to a temperature no less than about a temperature that the load bearing surface is expected endure in use and the temperature is maintained for a first period of time sufficient to heat the entirety of the membrane. The method includes cooling the membrane while maintaining the stress on the membrane. In an embodiment, the polymeric membrane is a thermoplastic polyester block copolymer.

In a method, the force applied to the polymeric membrane is about 5 lbs. to about 500 lbs. Preferably, the force applied to the membrane is about 50 lbs. to about 350 lbs. In a method, the temperature is about 60° C. to about 160° C., and preferably about 85° C. to about 100° C. In a method, the first period of time is about 60 seconds to about 10 hours, and preferably about 60 seconds to about 0.2 hours.

In a method, the polymeric membrane is a thermoplastic block copolymer, and in a method the thermoplastic block copolymer is a thermoplastic polyester block copolymer that affords the ability to change molecular weight (e.g., exhibit a phase change) within the soft block to balance compliance performance or elongation with unintended annealing of orientation crystallinity.

In a method the mount is a frame portion of an end use product, and the membrane is conditioned in the frame portion. An end use product can be for example, a seat, such as a vehicle seat that is expected to be subjected to elevated temperatures.

A seating surface for a vehicle, which seating surface is subjected to an elevated temperature, is formed by a method that includes the steps of positioning an oriented polymeric membrane in a mount, applying a force to the polymeric membrane so as to create a stress in the membrane, heating the stressed membrane to a temperature no less than the elevated temperature maintaining the membrane at the temperature for a first period of time sufficient to heat the entirety of the membrane and cooling the membrane while maintaining the stress on the membrane to form the vehicle seating surface.

These and other features and advantages of the present device will be apparent from the following description, taken in conjunction with the accompanying sheets of drawings, and in conjunction with the appended claims.

BRIEF DESCRIPTION OF THE DRAWINGS

The benefits and advantages of the present embodiments will become more readily apparent to those of ordinary skill in the relevant art after reviewing the following detailed description and accompanying drawings, wherein.

DETAILED DESCRIPTION

Figure 1A:
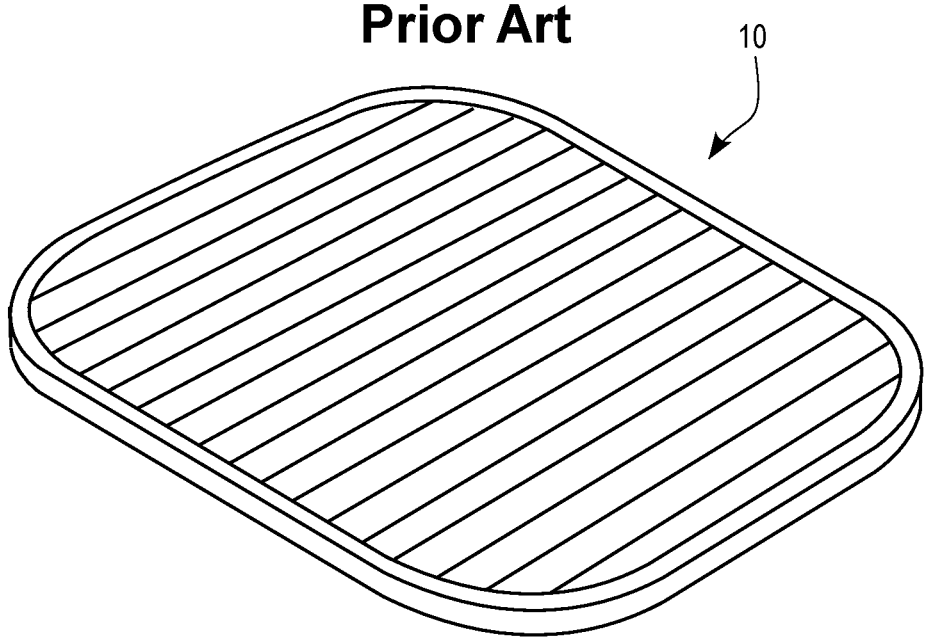
FIGS. 1A-1C are various forms of conditioned membranes embodied as load bearing surfaces in accordance with the present disclosure.
Figure 1B:
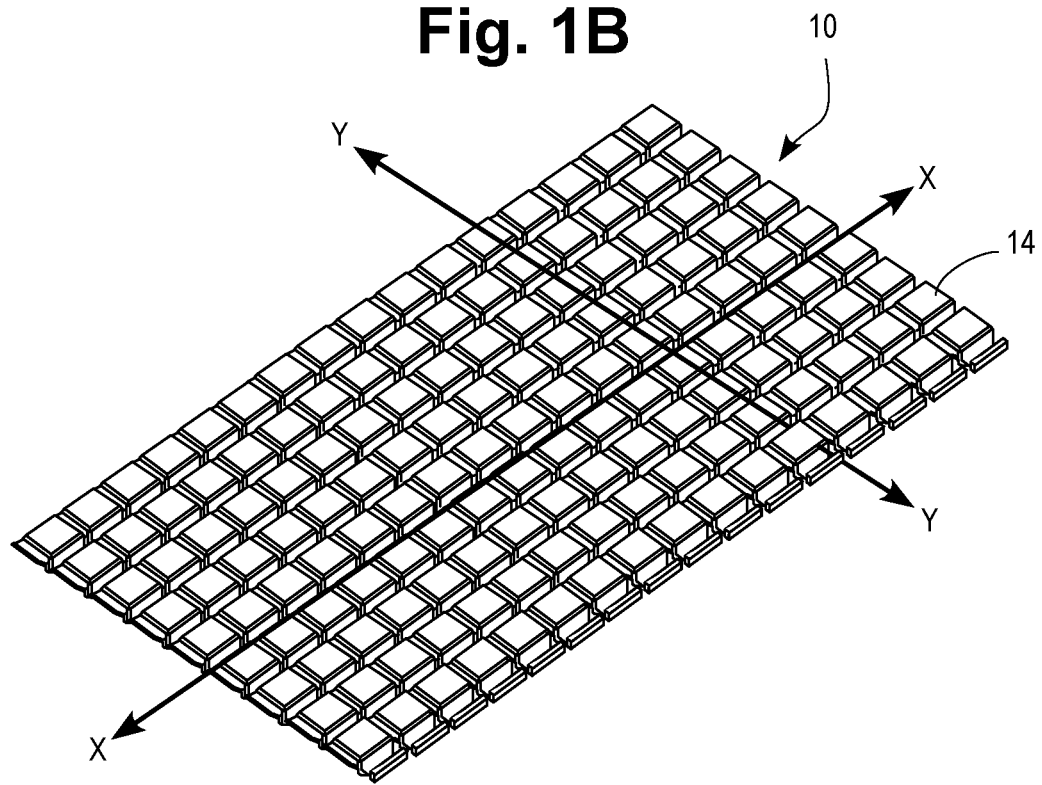
Figure 1C:
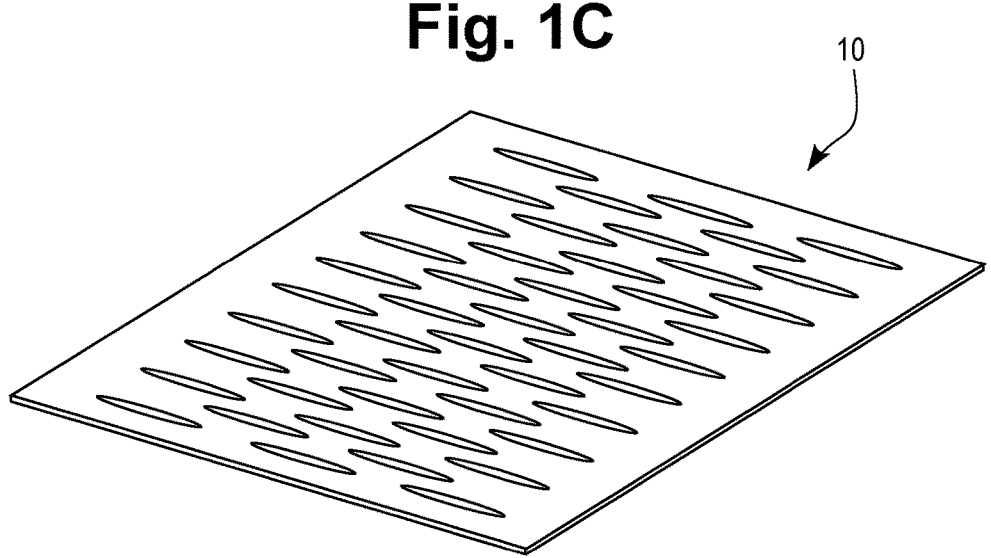

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 6:
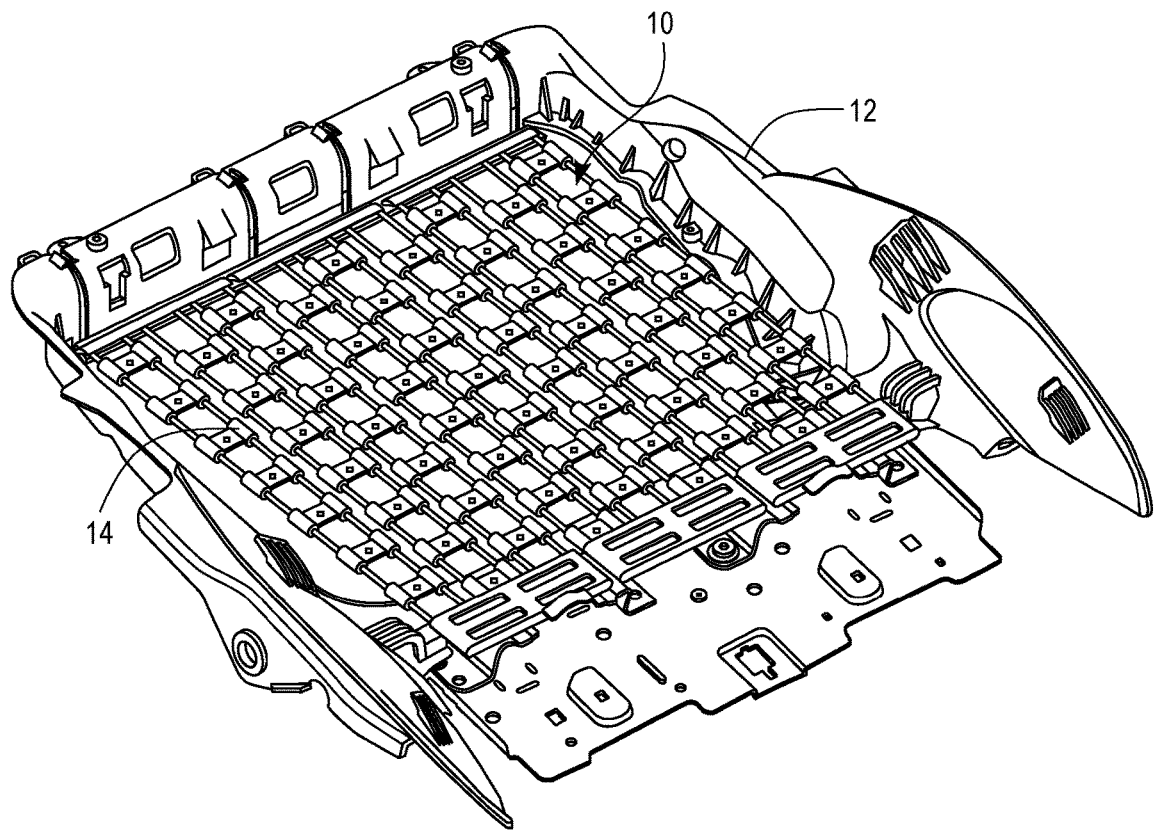
FIG. 6 is an illustration of one example of a membrane in a use for a seat bottom.

A conditioned load bearing surface 10 according to an embodiment is shown in FIG. 6. The illustrated conditioned load bearing surface is a molded membrane that may be suspended from a support structure 12, such a chair seat frame. The conditioned load bearing surface 10 includes support characteristics that differ in different directions, which characteristics are retained by the surface at and following exposure to elevated temperatures. For example, the load bearing surface 10 may provide significant elastic support in the x direction while providing relatively little support in the y direction. This "decoupling" of the support characteristics of the load bearing surface 10 provides a high degree of comfort. For purposes of the present disclosure, the embodiments described herein are intended primarily for use in seating applications. The present disclosure is not, however, limited to use in seating applications, but may also be used into other load bearing applications. The support characteristics of the molded membrane are highly adjustable, thereby permitting the load bearing surface 10 to be tailored to support a variety of loads in a variety of different applications.

The load bearing surface 10 includes a molded elastomeric membrane 14, such as that disclosed in the aforementioned patents to Coffield, U.S. Pat. Nos. 9,215,933, 9,173, 496, and 7,441,758. One suitable material for molding the membrane 14 is a thermoplastic polyester elastomer block copolymer, such as that available from DuPont under the mark HYTREL®. Other suitable materials will be appreciated by those skilled in the art. For example, it is contemplated that materials such as fluoroelastomers may also be used for the molded load bearing surface 10.

In an embodiment, the molded membrane 14 is oriented in one direction, for example, the x direction, to provide creep resistance and elasticity in the direction of orientation. The membrane 14 is oriented by increasing the alignment of the crystalline structure of the elastomeric membrane on a molecular level so that its support and other load bearing characteristics are altered. Typically, the membrane 14 will be oriented to such a degree that the oriented membrane has materially different load bearing characteristics in the oriented direction than in other directions.

Referring to FIGS. 3A-3C and 4A-4D, one method for orienting the membrane 14 is through stretching. The amount of stretch required to obtain the desired alignment will vary from application to application, but in most applications the desired degree of alignment will occur when the membrane 14 is stretched to roughly four to six times its original dimension. Although the elastomeric membrane 14 may be oriented by stretching the membrane, it may be possible in some application to orient the membrane using other processes, such as, for example, by hammering or other forms of compression, rather than stretching.

It should be noted that many elastomeric materials, including molded HYTREL®, have essentially no elasticity and are susceptible to a high degree of creep when in a molded form. The orientation process causes a significant change in the properties of the elastomeric material, for example, increasing the elasticity of the material and decreasing its inherent susceptibility to creep over time and under high temperatures.

In order to anneal or condition the oriented load bearing membrane, following orientation, e.g., stressing the membrane beyond the yield point of the material for a predetermined period of time, the membrane stressed is reduced (more than 0 MPa stress), and immediately positioned in mount position. Mount position is referred to as an intermediate stress level that is lower than peak stress used in orientation but higher than 0 to provide necessary product function and characteristics, such as comfort. The de-stressing period may be from about 5 seconds to about 24 hours or more.

The membrane mounted on the frame is then conditioned, as by heating, for a predetermined period of time while under stress. The conditioning temperature will vary depending upon a number of factors, including the membrane geometry, the material, the end use and the environment to which the end use product will be subjected. Likewise, the force applied to the membrane (e.g., the tension to which the membrane is subjected), will also vary depending upon the various factors including the material, the end use and the environment to which the end use product will be subjected. The time during which the membrane is conditioned will also vary based on the above-noted factors.

For example, using the HYTREL® material noted above, the conditioning temperature for the material can be about 60° C. to about 160° C., the force to which the membrane is subjected can be about 5 lbs. to about 500 lbs. and the time duration of conditioning can be about 60 seconds to about 10 hours. The time varies so as to assure that the heat (energy) effectively penetrates, and the temperature increase is effected through, the entirety of the membrane structure (which may be due, in part, to the membrane geometry).

Following conditioning, e.g., heating, the membrane is cooled, during which time the membrane is maintained under stress or strain. In a method, the membrane is maintained at a level of stress or strain (under a pressure) about equal to that to which the membrane is expected to be subjected to under normal anticipated use or application to stabilize the membrane. Stabilization can be carried out for a period of about 1 minute to about 5 days at an ambient or expected use temperature.

Figure 2:
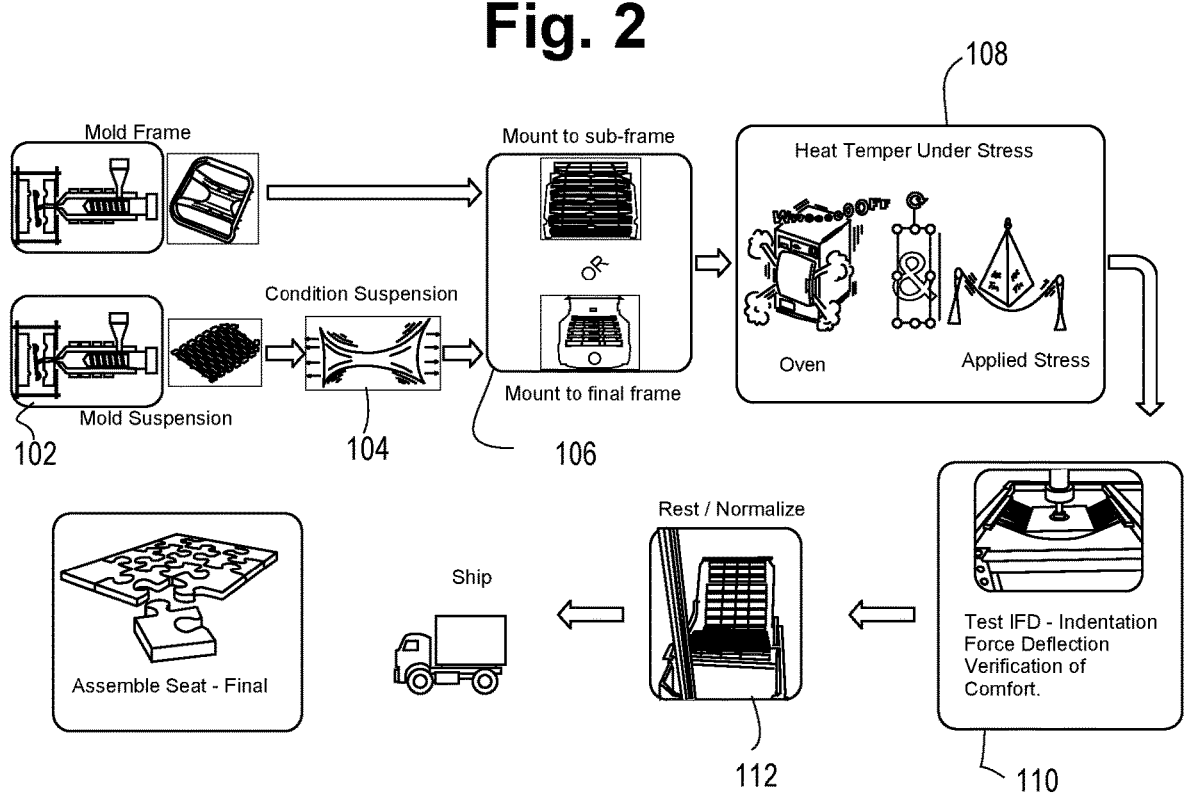
FIG. 2 illustrates a method for forming the conditioned membrane as a load bearing surface.
Figure 3A:
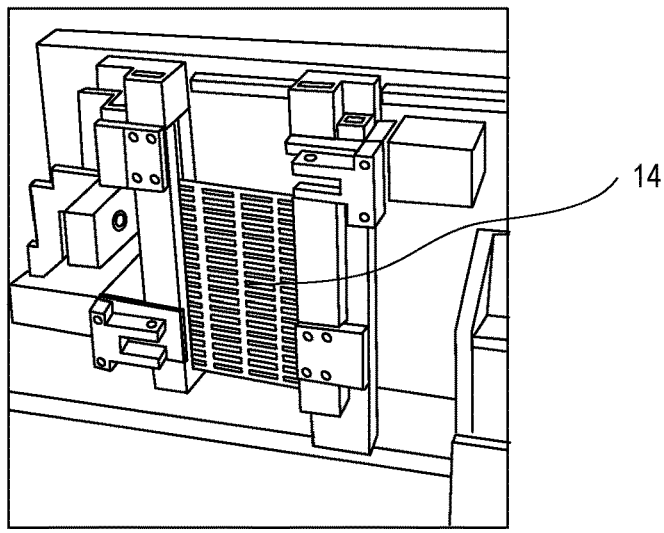
FIGS. 3A-3C are illustrations of a membrane embodied as a load bearing surface prior to orienting (FIG. 3A), as it is being oriented by tensioning the membrane (FIG. 3B), and following orienting, showing the tensioned, oriented membrane (FIG. 3C)
Figure 3B:
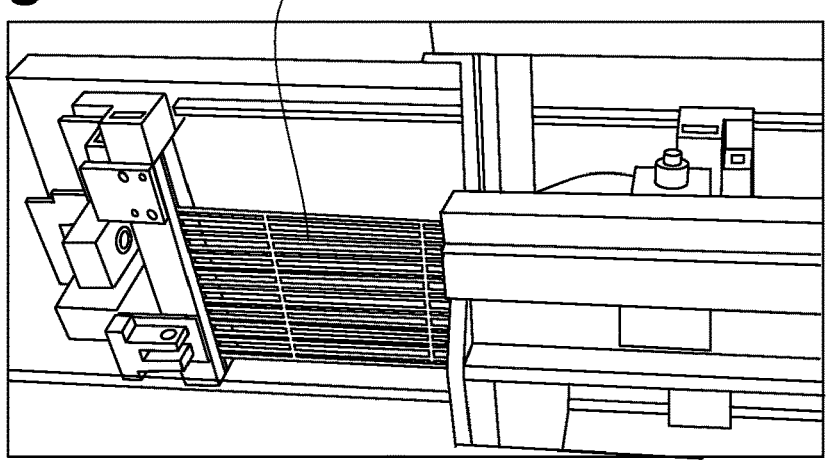
Figure 3C:
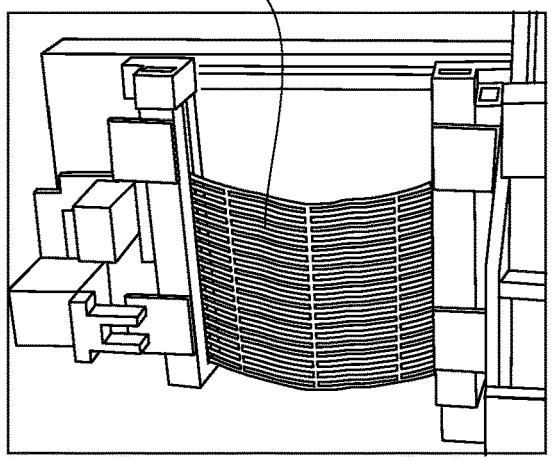
Figure 4A:
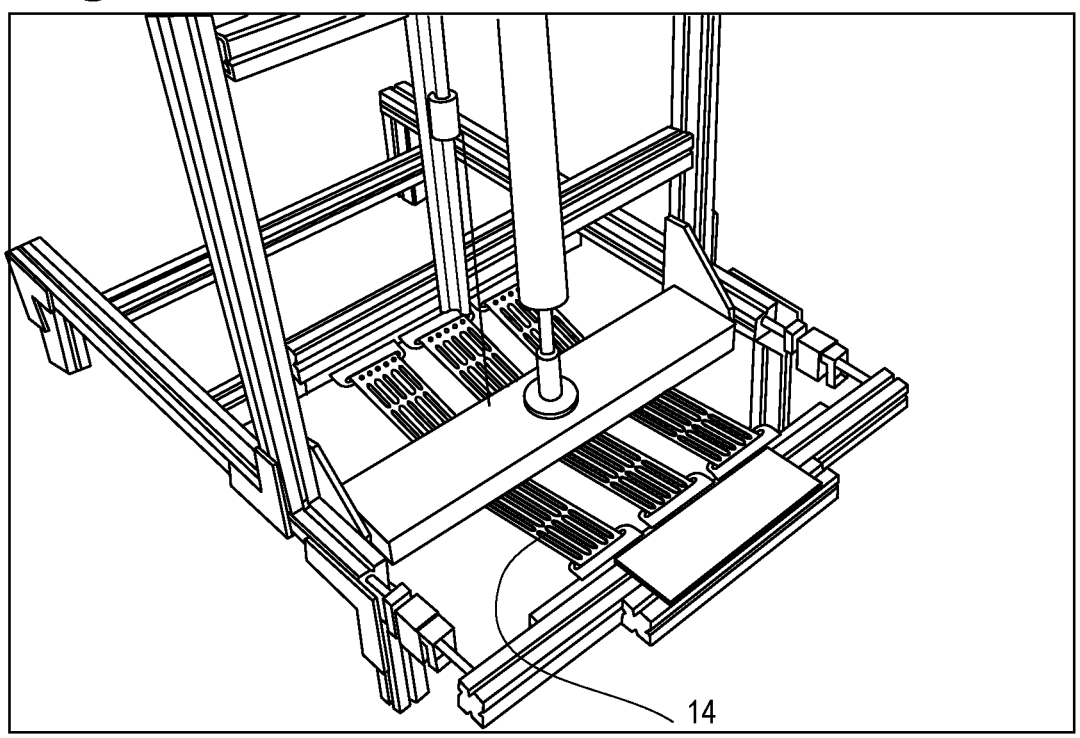
FIGS. 4A-4D are illustrations of an oriented membrane embodied as a load bearing surface as it is placed in a frame for conditioning, showing a load applied to the membrane (FIG. 4A), the membrane with the applied load positioned in an oven (FIG. 4B), the membrane with the load still applied as it is removed from the oven (FIG. 4C), and the membrane with the load removed (FIG. 4D)
Figure 4B:
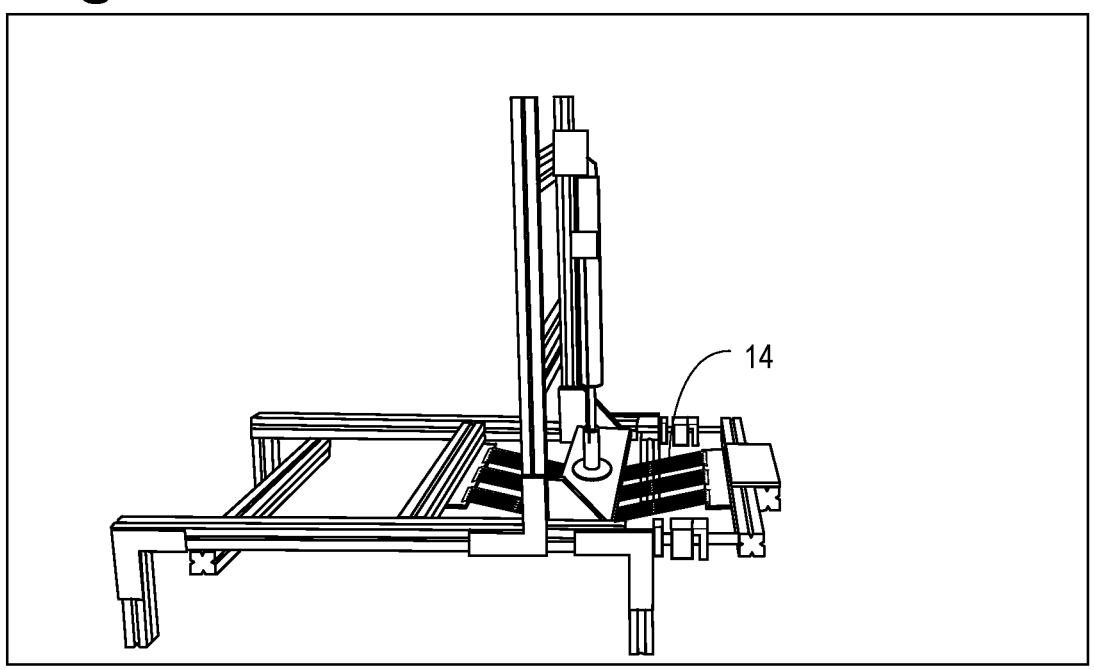
Figure 4C:
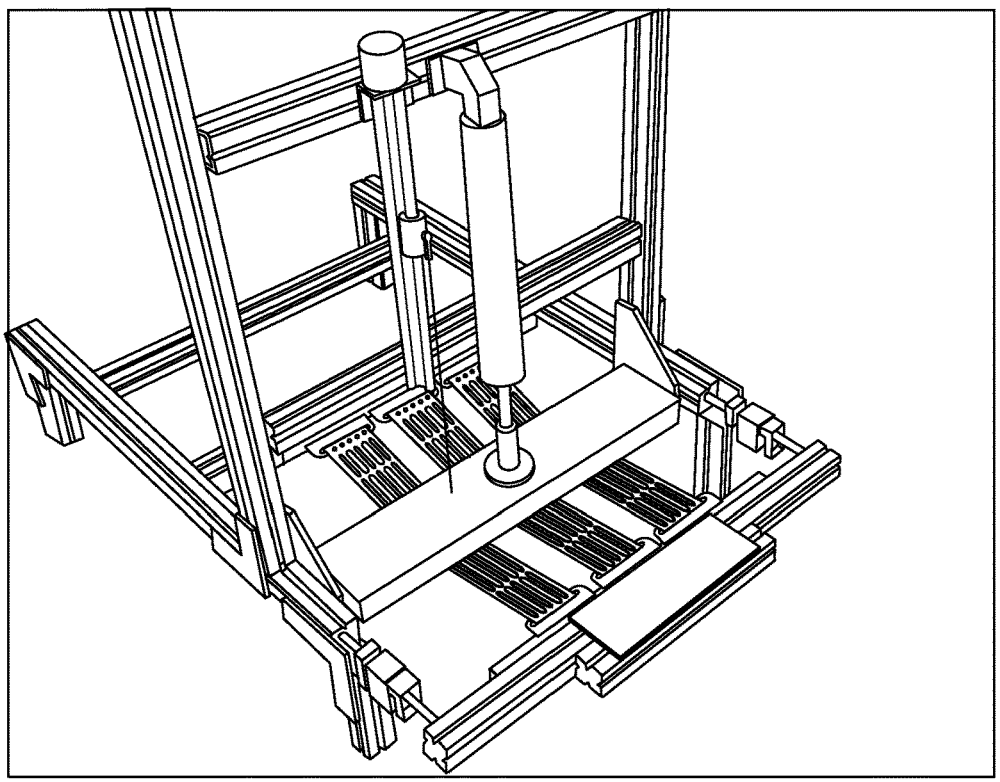
Figure 4D:
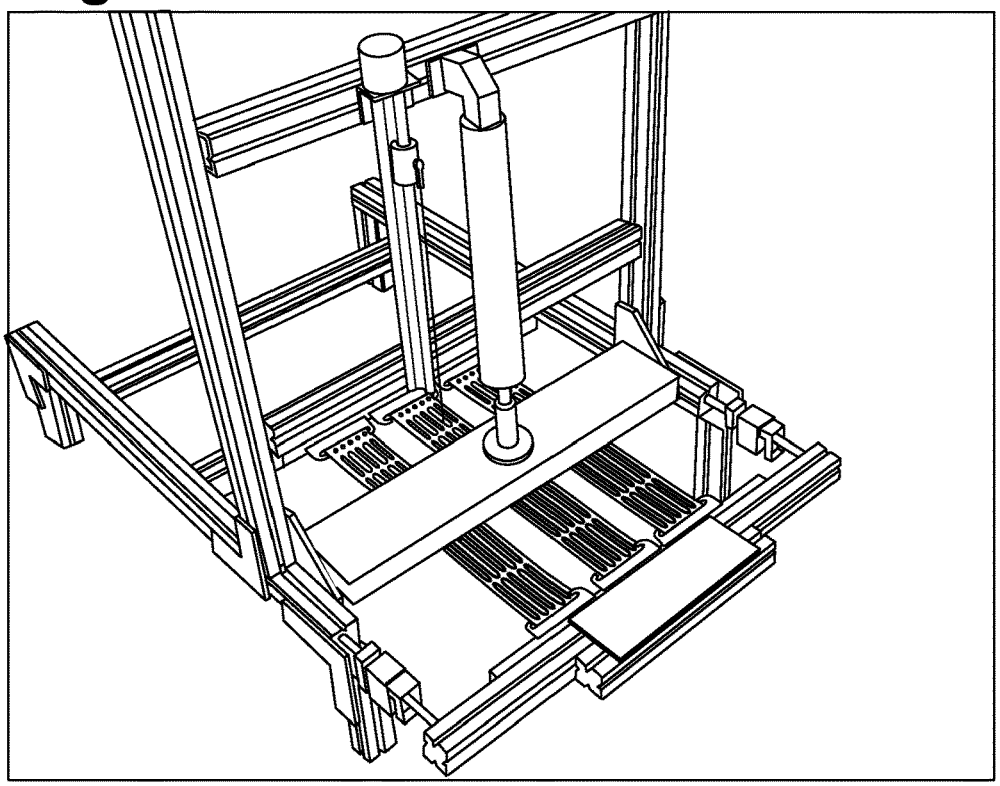

An illustrative example of a method for conditioning a load bearing surface is illustrated in FIG. 2. A membrane is first molded by, for example, injection molding, extruding, injection compression, compression molding, or any other molding method as indicated at step 102. The membrane can be molded from a thermoplastic polyester elastomer block copolymer, such as HYTREL® The molded membrane is oriented by stressing the membrane beyond the yield point of the material as indicated at step 104. The membrane can be stressed by, for example, stretching the membrane beyond the yield point, such as disclosed in the aforementioned patents to Coffield. The membrane is then partially or fully de-stressed.

Within a predetermined time period after destressing, for example, within about 5 seconds to 24 hours, the membrane is mounted to a frame, as indicated at step 106. The frame can be molded, prefabricated or supplied in any of a number of ways as well. Optionally, the membrane can be mounted to a transfer jig, a temporary assembly or the like for conditioning. For purposes of the present disclosure all of the above mounting arrangements will be referred to as a or the "mount".

The membrane on the mount is then heated by, for example, convection, conduction, infrared or other heating methods, as at step 108. The membrane on the mount can be positioned in an oven to heat to a temperature of about 60° C. to about 160° C. As the membrane is heated, it is again stressed at a predetermined force that can be about 5 lbs. to about 500 lbs. The stress can be applied in a variety of directions. For example, the stress can be applied in tension (e.g., an x- or y-direction parallel to a plane defined by the membrane) or the stress can be applied perpendicular to the plane defined by the membrane (e.g., into the membrane). The heat and stress are applied for a predetermined period of time. As noted above, the time, temperature and force applied for conditioning depends upon a number of factors, including but not limited to, the membrane geometry, the material, the end use of the product and the environment to which the end use product will be subjected. In addition, conditioning is carried out such that there is proper heat soak, i.e., thorough heating, of the membrane.

In a method, following conditioning, the applied stress is maintained during a cool down period. The membrane will remain under continuous stress and strain equal to the stress or strain imposed by the frame or subassembly. It is preferred that the membrane remain under a condition of continuous stress and strain even in the case where a jig is used during conditioning and subsequently released for mounting the membrane to the frame or sub assembly. The membrane mounted to the frame is then stabilized, as by allowing the membrane (under stress and strain conditions) to rest in its final state at about ambient temperature for about 1-5 days prior to product use, as at step 112. The membrane 14 can be tested for proper indentation force deflection (IFD) characteristics, for example, as at step 110.

Without being held to theory, it is believed that subjecting unconditioned, oriented membranes to elevated temperatures relaxes the aliphatic orientation of the resin molecules returning the molecules to an amorphous state. That is, aliphatic crystals are introduced through stress and strain and by controlling the polymer performance loss utilizing force and elevated temperature by process controls within a conditioning process.

Elevated temperatures also reduce the secondary yield point and elongation values to near pre-orientated values. This reduction in yield and elongation reduces the membrane spring effect, and makes IFD measurement unpredictable and unstable especially at temperatures above about 50° C. Moreover, it has been found that using the present process. creep resistance remains intact, increased yield performance remains intact and increased polymer elongation performance remains intact. Further, it has been observed that in an exemplary use, notch resistance based on orientation remains intact when the polymer is exposed to automotive interiors, and that stress resistance of the oriented polymer remains intact when the polymer is exposed to automotive interiors.

The conditioning process maintains the membrane geometry under continuous tensile stress hindering much of the phase change from the aliphatic phase back to the amorphous phase. The molecules that do change phase during the conditioning process become predictable and repeatable thus providing a platform for geometry design. Conversely, removing the conditioning stresses and re-stressing allows the resin to undergo phase change randomly causing tensile stress and IFD readings to be equally random and uncontrolled.

It has been found that properly conditioning the geometry to the greatest extent possible hinders the loss of orientation of the membrane during end use, where the membrane may see elevated service temperatures and possible heavy loading at those elevated temperatures.

In a method, the conditioning process parameters of heating and stressing are within about 20 percent of the product end use temperature and peak stresses. The present conditioning process allows a proportionate number of molecules to return to an amorphous state, while maintaining many molecules aliphatic and orientated under a targeted load and temperature level. Thus, a peak stresses of 5 lbs. to 500 lbs. is applied at a temperature in a range of about 60° C. to 160° C.

Again, the molecules that remain orientated after conditioning do not return to the amorphous phase unless the product temperature or load exceeds the conditioning load and temperature. The molecules that remain aliphatic after conditioning do not undergo a phase change to amorphous, and continue to provide hyper elasticity and heightened yield stress values at extreme temperatures.

Figure 5:
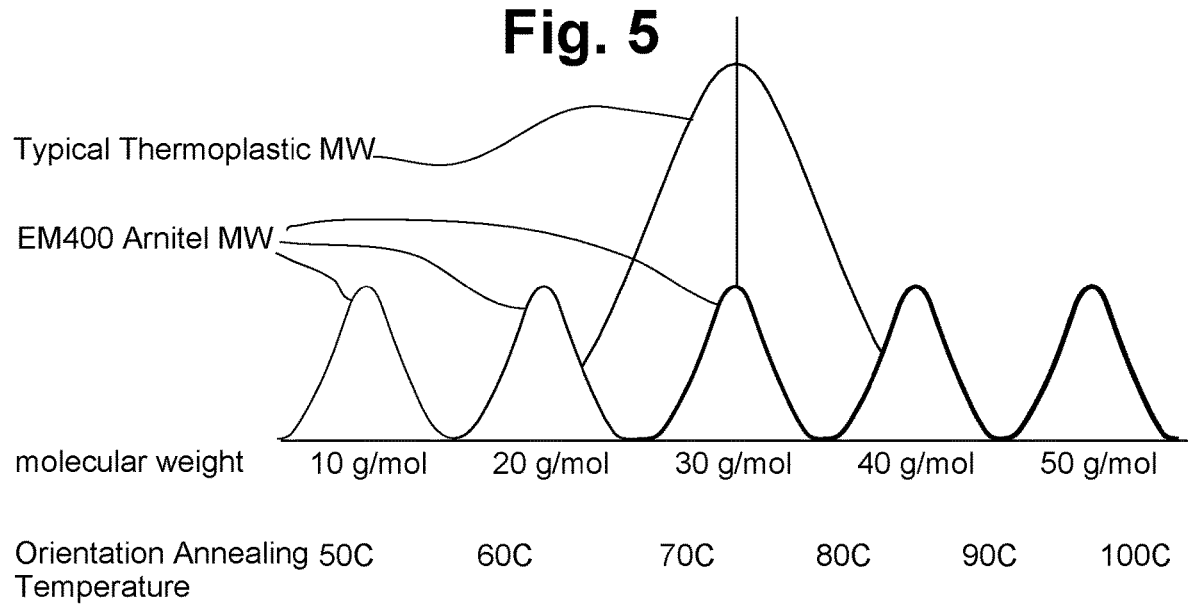
FIG. 5 is a graphic illustration of the molecular weight distribution of a typical thermoplastic and the phase change temperature shown in Curve 1, and the molecular weight distribution of a thermoplastic that has been conditioned in accordance with the present disclosure typical and the phase change temperatures shown in Curve 2.

The loss of orientation in unconditioned membranes due to heating (loss of orientation of the polymeric molecules in the membrane) in aliphatic resins varies because the phase change between amorphous and aliphatic takes place over a range of temperatures. The temperatures when graphed on a histogram form a standard distribution and typical bell curve using statistical methods (see Curve 1 in FIG. 5) It is believed that this is why there is inconsistent product length and IFD without conditioning the membrane after orientation.

The resilience of the conditioned membranes is due to molecular weight standard distribution and resulting covalent bond strength that controls phase changes at elevated (conditioning) temperatures of an oriented resin. Smaller molecular weight molecules lose orientation (i.e., phase change from the aliphatic to the amorphous state) at lower temperatures, about 60° C., while higher molecular weight molecules do not undergo phase change until higher temperature are reached, about 160° C. Resins such as block copolymers permit selecting softer block molecular weight resins to control the phase change temperature range of the resin. For example, polyether is a typical soft block and polybutylene terephthalate is a hard block of HYTREL® resin, and as such these resins enable conditioning the membrane when it is orientated. The soft block copolymer molecular weight standard deviation is proportional to the conditioning temperature standard deviation when plotted on a histogram (see, Curve 2 in FIG. 5). The effectiveness of the conditioning process results in the high molecular weight soft block molecules remaining aliphatic at product use temperatures thus insuring the membrane retains heightened yield strength and elongation.

In the present disclosure, unless otherwise noted, all percentages (%) are percent by weight as appropriate. In addition, the words "a" or "an" are to be taken to include both the singular and the plural. Conversely, any reference to plural items shall, where appropriate, include the singular.

All patents or patent applications referred to herein, are hereby incorporated herein by reference, whether or not specifically done so within the text of this disclosure.

From the foregoing it will be observed that numerous modification and variations can be effectuated without departing from the true spirit and scope of the novel concepts of the present film. It is to be understood that no limitation with respect to the specific embodiments illustrated is intended or should be inferred. The disclosure is intended to cover by the appended claims all such modifications as fall within the scope of the claims.

The invention claimed is:

1. A method for conditioning a load bearing surface comprising:
    stretching a membrane to form an oriented polymeric membrane;
    positioning the oriented polymeric membrane in a mount;
    applying a force to the oriented polymeric membrane so as to create a stressed membrane;
    heating the stressed membrane to a temperature between 60° C. and 160° C.;
    maintaining the stressed membrane at the temperature for a first period of time sufficient to heat the entirety of the stressed membrane; and
    cooling the stressed membrane.

2. The method of claim 1, wherein the polymeric membrane is a thermoplastic block copolymer.

3. The method of claim 2, wherein the thermoplastic block copolymer is a thermoplastic polyester block copolymer.

4. The method of claim 1, wherein the force applied to the polymeric membrane is about 5 lbs. to about 500 lbs.

5. The method of claim 4, wherein the force applied to the membrane is about 50 lbs. to about 350 lbs.

6. The method of claim 1, wherein the temperature is about 85° C. to about 100° C.

7. The method of claim 1 wherein the first period of time is about 60 seconds to about 10 hours.

8. The method of claim 7 wherein the first period of time is about 60 seconds to about 0.2 hours.

9. The method of claim 1 wherein the mount is a frame portion of an end use product, and wherein the membrane is conditioned in the frame portion.

10. The method of claim 9 wherein the end use product is a seat.

11. The method of claim 10 wherein the seat is a vehicle seat.

12. The method of claim 1, wherein stretching the membrane to form an oriented polymeric membrane includes stretching the membrane between four and six times an original dimension of the membrane.

13. The method of claim 1, wherein stretching the membrane to form an oriented polymeric membrane includes stressing the membrane beyond the yield point.

14. The method of claim 1, wherein after the membrane is stretched, the polymeric membrane is de-stressed before being positioned in the mount.

* * * * *